United States Patent Office 2,723,573
Patented Nov. 15, 1955

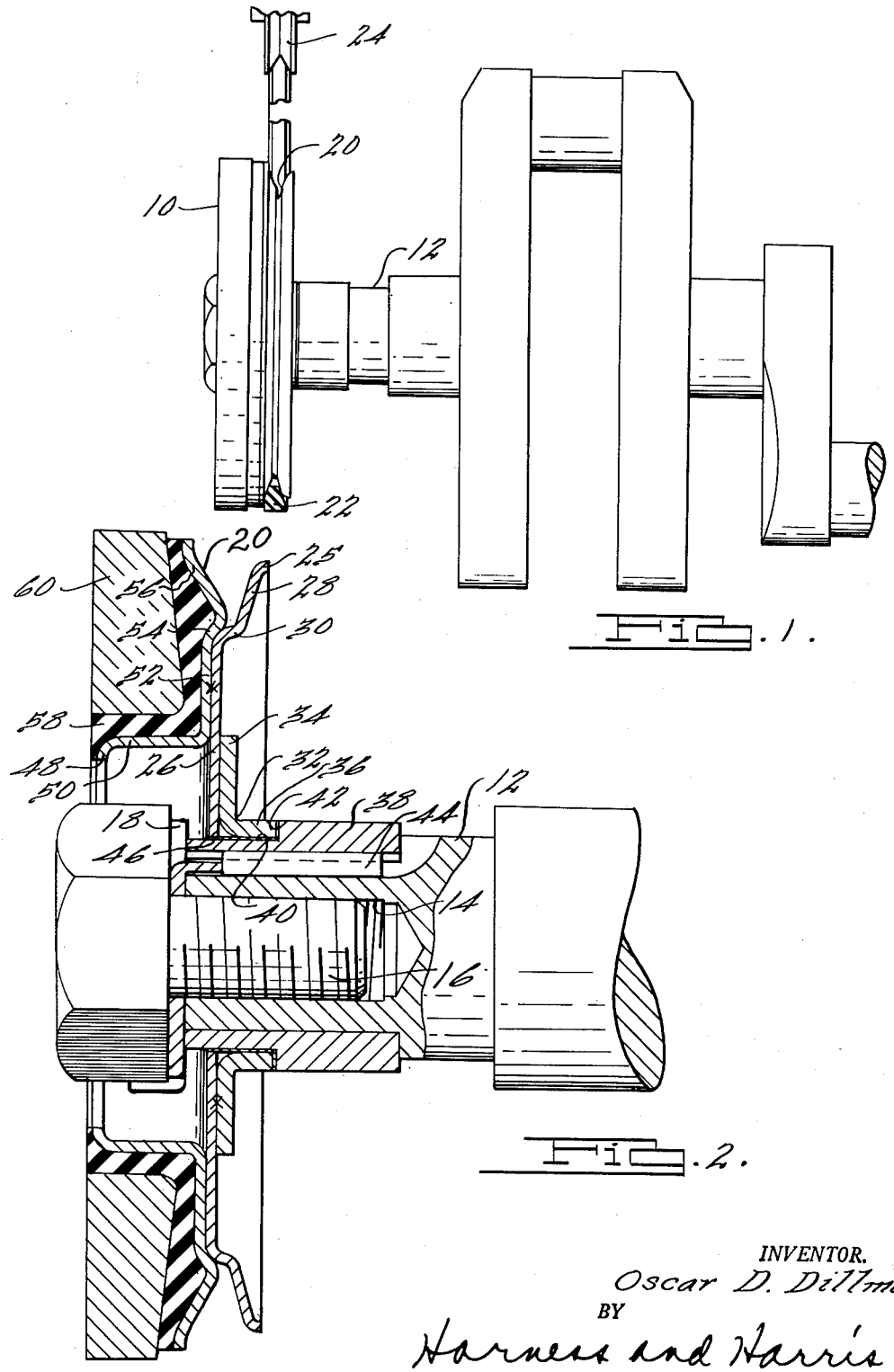

2,723,573

VIBRATION DAMPER

Oscar D. Dillman, Huntington Woods Manor, Mich., assignor to Chrysler Corporation, Highland Park, Mich., a corporation of Delaware Application September 29, 1950, Serial No. 187,573

8 Claims. (Cl. 74—574)

This application relates to torsional vibration dampers, particularly to devices of this character for dampening vibrations of crankshafts of internal combustion engines.

Vibration dampers hitherto proposed have been provided with an inertia member yieldably secured to the crankshaft and adapted for movement relative thereto such that a yieldable driving connection is provided between the inertia member and crankshaft which is to accommodate all different amplitudes of relative movement. The sheave necessarily associated with the inertia member has conventionally been of the folded-over sheet metal type having a fold spun over at the point where the sheave web joins on to the groove portion. Such construction has been observed to lead to failures in sustained operation and to a bulky assemblage necessarily bolted together in order properly to include the damper hub flanges.

According to a feature of the present invention, a vibration damper is provided having a unitary construction requiring no bolts or fasteners to retain the assemblage together.

According to a further feature of the invention a vibration damper is provided which has a web of reinforced construction such as will prevent failures in operation.

Another object of the invention is to provide a vibration damper with a belt receiving V-groove which is formed of two separate members that are free from spun-over folds and which are so nested together as to directly mechanically transmit belt applied force from one part to the other without exerting a separatory action tending to stress in tension the bond between the parts.

A still further object of the invention is to provide a nested arrangement of belt-groove forming parts which presents a joint that is normally stressed in shear by the belt applied forces and which therefore is adapted to be bonded together by hydrogen welding which produces strong shear resisting bonds.

A further object of the invention is to provide in a vibration damper having a rubber-supported inertia element, a combined fan belt groove providing element and inertia member support which is of unitary construction and may be completely formed prior to application of the rubber and bonding of it to the support and inertia member.

An additional feature of the invention is the provision of a vibration damper in which the immediate structure supporting the inertia member is unitary and continuous and hence there is no occasion for intervening welds adjacent or along the rubber bonding for the inertia member.

According to yet another feature of the invention, provision is made in a damper for overlap of reinforcing members adjacent the web such as to sustain without failure excessive loadings and recurrent vibratory loads.

Further features of these and other advantages will either be specifically pointed out or become apparent when made to the following description taken in conjunction with the accompanying drawings in which:

Figure 1 is a side elevational view of a crankshaft equipped with a vibration damper embodying the invention;

In Figure 2 is an enlarged sectional view of the damper in the form of the invention shown in Figures 1 and 2.

The vibration damper generally designated by the numeral 10 is mounted to the front end of a crankshaft 12, the latter having an axially extending threaded bore 14 in which a bolt 16 is screw-threaded and retained by a lock washer 18. The vibration damper has a V-groove 20 in which is received a flexible V belt 22 trained over one or more sheaves 24 for driving circulating fans, pumps, generators, or the like. A dished member 25, which comprises a sheet metal stamping, has a transverse web portion 26 connected as by a convoluted region 30 to a generally offset rim portion 28 oblique to web portion 26 and forming one side of the V-groove above noted. An annular element 32 of angle section has one leg 34 engaging the relatively inner regions of web portion 26 and secured thereto as by bonding, brazing, welding and the like. Element 32 has another leg 36 which is received in a reduced portion 40 of a hub 38 such as to engage a shoulder 42 provided on the hub. Hub 38 and crankshaft 12 are slotted to provide a keyway in which is received a key 44 and also in which is received the locking tab of the lock washer 18. Dished member 25 is provided with a central opening 46 in which is received the reduced portion 40 of hub 38. The leg 36 of annular element 32 is secured to hub 38 by welding, brazing, or bonding; the hub 38 is carried by the forward end of crankshaft 12 to which it is press fitted. The hub is held against relative rotation by means of the key 44.

An annular sheet metal element 48 of angle section has legs 50 and 52, the latter of which is provided with a convoluted region 54 by which is carried a rim portion 56 forming the remaining side of the V-groove 20. Bonded to the respective legs or sections 50 and 52 is an elastic body 58 which may be of rubber, neoprene, or the like. The elastic body 58 is in turn bonded to an annular inertia member 60 and provides for relative angular movement between the inertia member 60 and the remainder of the vibration damper structure. Rim portions 56 and 28 cooperate to provide the V-groove for the sheave. The annular sheet metal element 48 and the dished member 25 are secured to one another preferably by hydrogen brazing, although other forms of welding may be employed. Convoluted regions 54 and 30 are effectively nested together to permit the hydrogen braze between element 48 and dished member 25 to act mainly in shear rather than primarily in direct tension because the hydrogen braze has been found to be relatively stronger in shear than in tension. The nested relationship of the convoluted regions 30 and 54 together with the relative annular disposition of the rim portions 28 and 56, provides rigid resistance to radial pull of the belt without requiring the weld between the parts 48 and 25 to solely withstand this action.

The leg 52 of the member 48 is secured on one side of the web 26 and the leg 34 of the annular element 32 is secured to the other side of the web 26 with the innermost portions of the leg 52 radially overlapping the outermost portions of the leg 34 so as to leave no portion of the web 26 without reinforcement. It will be readily apparent that web portion 26 is suitably reinforced along its entire length and without any weak spots since the legs 52 and 34 are radially overlapped. Thus no appreciable portion of the radial length of leg 26 is without reinforcing backing by radial portions of either legs 52 or 34. Since V-groove 20 is formed of two separate parts 48 and 25, the need for a spun over sheave is obviated and no portion of sheet metal which is folded back on itself is required.

Variations within the spirit and scope of the invention described are equally comprehended by the foregoing description.

What is claimed is:

1. In a vibration damper, the combination of a hub, a dished member on the hub providing a web portion generally extending radially from the hub and a rim portion laterally offset and oblique with respect to the web portion to define one side of a V-way, an annular element comprising a pair of angularly disposed sections one of said sections being attached to the web portion of the dished member and formed at its extremity to define the opposite side of said V-way, an inertia member received in the angle between said sections in spaced relation thereto and an elastic body bonded to said sections of the annular element and to the inertia member providing for limited relative motion between the same.

2. In a vibration damper, the combination of a hub, a dished member on the hub providing a web portion generally extending radially from the hub and a rim portion laterally offset and oblique with respect to the web portion to define one side of a V-way, an annular element comprising a pair of angularly disposed sections one of said sections being attached to the web portion of the dished member and formed at its extremity to define the opposite side of said V-way, an inertia member received in the angle between said sections in spaced relation thereto, an elastic body bonded to said sections of the annular element and to the inertia member providing for limited relative motion between the same, and an annular element of angle section having one leg thereof attached to the hub and the other leg attached to the web portion of the dished member on the side thereof opposite the first named annular element.

3. In a vibration damper, the combination of a hub, a dished member on the hub providing a web portion generally extending radially from the hub and a rim portion laterally offset and oblique as respects the web portion to define one side of a V-way, an annular element of angle section having one leg attached to a relatively outer region of the web portion of the dished member and formed at its extremity to define the opposite side of a V-way, an inertia member received in the angle of said element in spaced relation to the legs thereof, and an elastic body bonded to the legs of the annular element and to the inertia member providing for limited relative motion between the same, and an annular element of angle section having one leg thereof attached to the hub and the other leg attached to the web portion at a region generally inward as respects the leg attachment of the first named annular element.

4. A torsional vibration damper comprising a hub, a dished member having a web portion formed to receive the hub centrally thereof and a rim portion relatively offset and oblique to the web portion, an annular element of angle section having one leg thereof attached to relatively outer regions of the web portion of said dished member and formed to provide a rim portion at the extremity thereof inclining generally obliquely to the web portion aforesaid, an annular element of angle section having one leg thereof attached to the hub, the other leg attached to relatively inner regions of said dished member and on the side opposite the first named annular element such that the said other leg and the said first named annular element one leg overlap as respects the web portion of the dished member, an inertia member received in the angle of the first named annular element in spaced relation to the legs thereof, and an elastic body connected to the first named annular element and to the inertia member having at least a portion intervening adjacent the rim portion of the first named annular element, the rim portions of the first named annular member and of the dished member cooperating to form a V-groove elastically movable due to the intervening elastic body relative to the inertia member.

5. A torsional vibration damper comprising a hub, a dished member having a web portion receiving the hub and disposed in a generally transverse plane thereabout formed to receive the hub centrally thereof and a rim portion relatively offset and oblique to the plane of the web portion, an annular element of angle section having one leg thereof attached to relatively outer regions of the web portion of said dished member and formed to provide a rim portion at the extremity thereof inclining generally obliquely to the plane of the web portion aforesaid, an annular element of angle section having one leg thereof attached to the hub, the other leg attached to relatively inner regions of said dished member and on the side opposite the first named annular element such that the said other leg and the said first named annular element one leg overlap as respects the plane of the web portion of the dished member, an inertia member received in the angle of the first named annular element in spaced relation to the legs thereof, and an elastic body connected to the first named annular element and to the inertia member having at least a portion intervening adjacent the rim portion of the first named annular element, the rim portions of the first named annular member and of the dished member cooperating to form a V-groove substantially in said web portion plane and adapted by said elastic body to be elastically movable relative to the inertia member.

6. In combination, a hub having a stepped reduced portion, an annular element of angle section having a leg attached to the reduced portion of the hub and engaging the step thereof, the other leg of the angle element extending transversely of the hub, a dished member defining a central opening receiving the reduced portion of the hub, said dished member having a radiating web portion, the inner regions of which engage the said other leg of the angle element and further having a laterally offset rim portion oblique to the web portion, an annular inertia element generally surrounding the hub and having an elastic body bonded thereto on the side of the inertia element nearer the dished member, and an annular member of angle section having a leg extending transversely between the said elastic body and dished member and formed at the extremity thereof to provide an oblique rim portion, said annular member leg being attached to the relatively outer regions of the said web portion and to the elastic body and arranged such that the rim portions aforesaid form a V-sheave operatively associated by the elastic body for angular movement relative to the inertia member.

7. In combination, a hub having a stepped reduced portion, an annular element of angle section having a leg attached to the reduced portion of the hub and engaging the step thereof, the other leg of the angle element extending transverse of the hub, a dished member defining a central opening receiving the reduced portion of the hub, said dished member having a radiating web portion, the inner regions of which attachably engage the said other leg of the angle element and further having a rim portion oblique to the web portion, an annular inertia element generally surrounding the hub and having an elastic body bonded thereto on the side of the inertia element nearer the dished member, and an annular member of angle section having a leg extending transversely between the said elastic body and dished member and formed at the extremity thereof to provide a laterally offset oblique rim portion, said annular member leg being attached to the relatively outer regions of the said web portion and to the elastic body and arranged such that the rim portions of the members aforesaid are nested to form a V-sheave operatively associated by the elastic body for limited relative angular movement with respect to the inertia member.

8. In a crank shaft vibration damper including a fabricated combined sheet metal pulley and inertia member adapted to be mounted on a portion of a crankshaft; a pair of juxtaposed annular members, said members each including a web portion and a peripheral portion inclined axially, said web portions being integrally joined together along contacting cooperating portions thereof, one of said members having a radially inward portion adapted to be joined to said crankshaft portion, the other of said members having an axially offset radially inward portion, said latter portion being radially spaced from said crankshaft portion, said peripheral portion being oppositely inclined to form a pulley groove, an inertia member adjacent the other of said members, and means surrounding said offset portion for yieldably connecting said inertia member and said other member to accommodate for limited relative movement therebetween.

References Cited in the file of this patent

UNITED STATES PATENTS

| | | |
|---|---|---|
| 2,049,133 | Peirce | July 28, 1936 |
| 2,153,914 | Christman | Apr. 11, 1939 |
| 2,473,335 | Hardy | June 14, 1949 |
| 2,526,744 | Hardy | Oct. 24, 1950 |
| 2,557,511 | Oles | June 19, 1952 |